MULTIPHONE FOR USE IN TELEPHONE SYSTEMS

Filed Aug. 23, 1954 5 Sheets-Sheet 1

INVENTOR.
RUDOLPH F. STEHLIK
BY [signature]
ATTY.

April 21, 1959 R. F. STEHLIK 2,883,472

MULTIPHONE FOR USE IN TELEPHONE SYSTEMS

Filed Aug. 23, 1954 5 Sheets-Sheet 2

INVENTOR.
RUDOLPH F. STEHLIK

BY *[signature]*

ATTY.

MULTIPHONE FOR USE IN TELEPHONE SYSTEMS

Filed Aug. 23, 1954 5 Sheets-Sheet 3

INVENTOR.
RUDOLPH F. STEHLIK
BY [signature]
ATTY.

INVENTOR.
RUDOLPH F. STEHLIK

BY Mc Walter Dwen

ATTY.

April 21, 1959 R. F. STEHLIK 2,883,472

MULTIPHONE FOR USE IN TELEPHONE SYSTEMS

Filed Aug. 23, 1954 5 Sheets-Sheet 5

INVENTOR.
RUDOLPH F. STEHLIK

BY [signature]

ATTY.

2,883,472

MULTIPHONE FOR USE IN TELEPHONE SYSTEMS

Rudolph Frank Stehlik, Antwerp, Belgium, assignor to General Telephone Laboratories, Incorporated, a corporation of Delaware Application August 23, 1954, Serial No. 451,361
16 Claims. (Cl. 179—39)

This invention relates in general to telephone systems and more particularly to one in which an executive subscriber can make calls by way of common switching equipment in a normal manner and can also make rapid calls to certain other subscribers by way of special equipment available to the executive.

Although the present disclosure assumes the use of an executive substation—hereinafter called a multiphone—together with special rapid call equipment available thereto in a private automatic branch exchange (P.A.B.X), it will be understood that the use of said multiphone and rapid call equipment is not restricted thereto. With slight modification, it can be used in a private intercom system; and it can be utilized in a private exchange or a community exchange. Obviously more than one multiphone with special rapid call equipment individually available thereto can be used in the system.

Much attention has been directed toward developing maximum speed in completing direct connections to other substations with a minimum of key operations while preserving many of the features normally found in common switching equipment such as automatic ringing, busy tone, optional priority, etc. These features normally found in common office equipment of an exchange have been introduced into the rapid call equipment auxiliary thereto, with the use of as little equipment as possible.

Accordingly it is an object of this invention to provide a very versatile switching circuit having means controlled by a multiphone user for establishing rapid direct connections to other substations in a system wherein said multiphone has means for connecting to other substations by way of common switching equipment.

A feature of this invention is the novel means by which the multiphone disconnects itself from one substation and connects itself to another by merely depressing a non-locking key.

A feature of this invention is the novel means by which the multiphone can establish a conference.

Another feature is the manner in which the direct lines from the rapid call equipment to certain substations are multipled to the lines connecting said substations to the common switching equipment in the P.A.B.X.

Another feature is the means by which the multiphone subscriber can transfer back and forth between an outside call and a conference call or between an outside call and a rapid call by depressing one key or another.

Another feature is the provision of optional means for giving the multiphone priority when calling another busy substation over a direct line.

Another feature is the provision of a novel means by which the busy or idle condition of a substation seized over a direct line may be tested, by which the multiphone will be connected to said seized substation if it is idle, by which a signal will be returned to the multiphone if the seized substation is busy, and by which a signal will be extended to the busy substation if desired.

Another feature is the provision of novel means by which the subscriber at the multiphone can hold his connections to a direct line terminating in a busy substation (which can be warned of the call) until the subscriber at the busy substation hangs up, at which time, means are automatically effective to ring the latter subscriber and to connect the multiphone to said direct line when said latter subscriber answers.

Another feature is the provision of means controlled from the multiphone for marking its line busy in the connector banks of the exchange when a rapid call is being made over one of the direct lines.

Additional objects and features will be evident upon a perusal of the following disclosure in which:

Fig. 1 shows in block diagram part of the private automatic branch exchange in which the preferred embodiment of the invention herein is to be used;

Figs. 2, 3 and 4 taken together show the multiphone and the rapid call equipment individual thereto;

Fig. 5 shows the line circuit for said multiphone and, in block diagram, a finder-connector link having access to the line circuit and a subsidiary substation to which the multiphone has access by a direct line; and, Fig. 6 shows the arrangement of Figs. 2–5.

The present case discloses a multiphone 200 (Fig. 2) in a private automatic branch exchange, said multiphone having a plurality of non-locking keys for making rapid connections to other local substations by way of a rapid call circuit 400 (Figs. 2–4). Said non-locking keys may be operated individually and when operated momentarily close contacts 285, 286, 287, 288 and 289, which contacts respectively operate relays R350, R360, R370, R380 and R390 in series with relay R240, if the hookswitch contacts 283 are closed when the keys are operated. Said relays extend connections respectively to substations 5, 4, 3, 2 and 1 (Fig. 1). Another non-locking key is provided to operate contacts 281 for connecting the multiphone 200 to the exchange switching equipment; and, still another non-locking key is provided to operate contacts 282 for the establishment of conference calls to said other local stations and for causing various switching operations in the exchange switching equipment. The direct lines extending from the rapid call circuit 400 to said other local substations are multipled directly to the line equipment associated with said substations; however, calls over said direct lines can be initiated only from the multiphone 200. The rapid call circuit 400 also includes means for testing the busy or idle condition of said other local substations, means for completing connections over said direct lines when the called substation answers, and optional means for warning a busy substation that the multiphone has called or for giving the multiphone priority. Said test means is arranged such that, if a called busy subscriber hangs up before the multiphone subscriber abandons the call, ringing current will be extended to said called subscriber so that he will answer the call.

DETAILED DESCRIPTION

*Extending connections to the finder-connector link 501*

Figure 2:
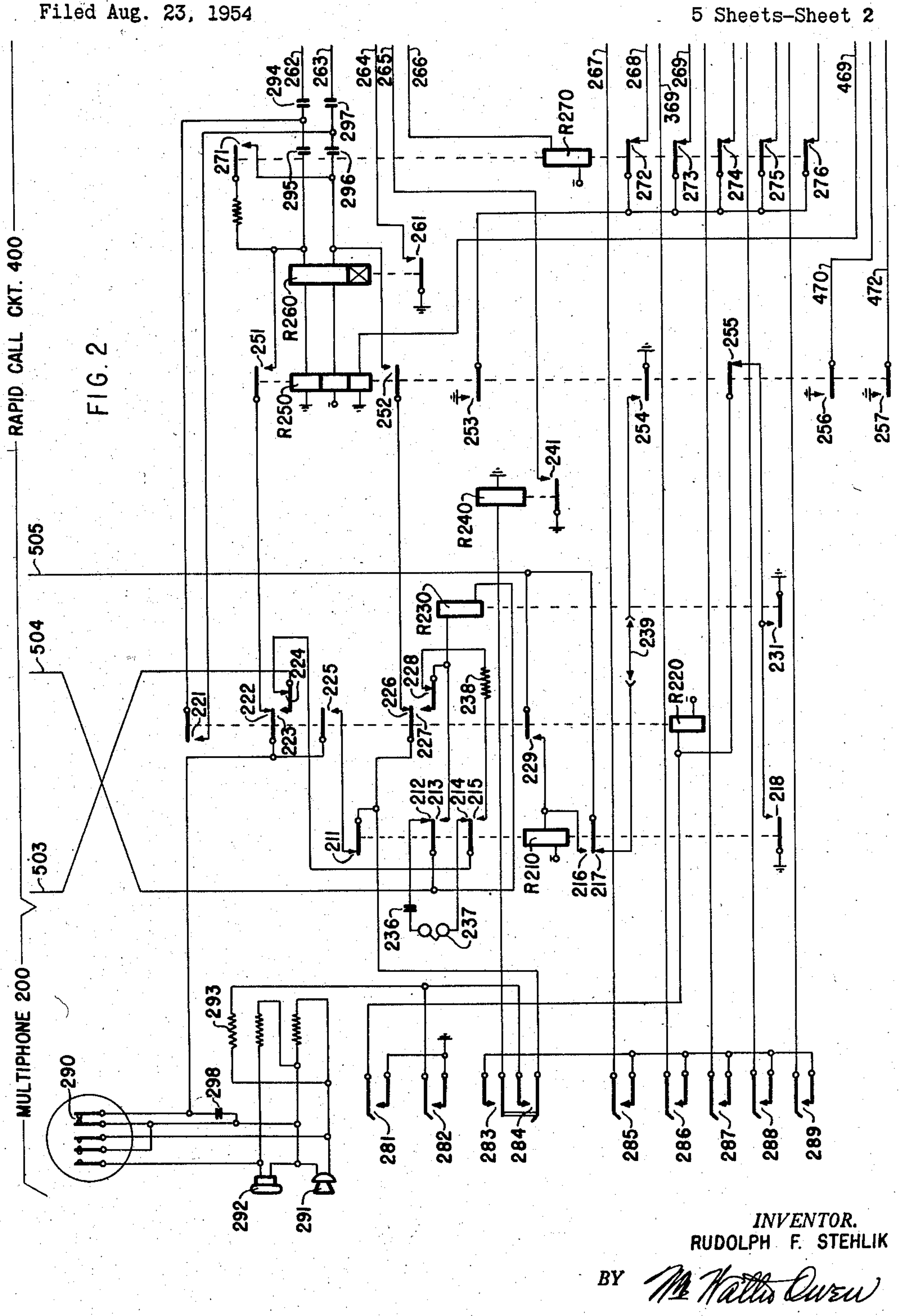
Figure 3:
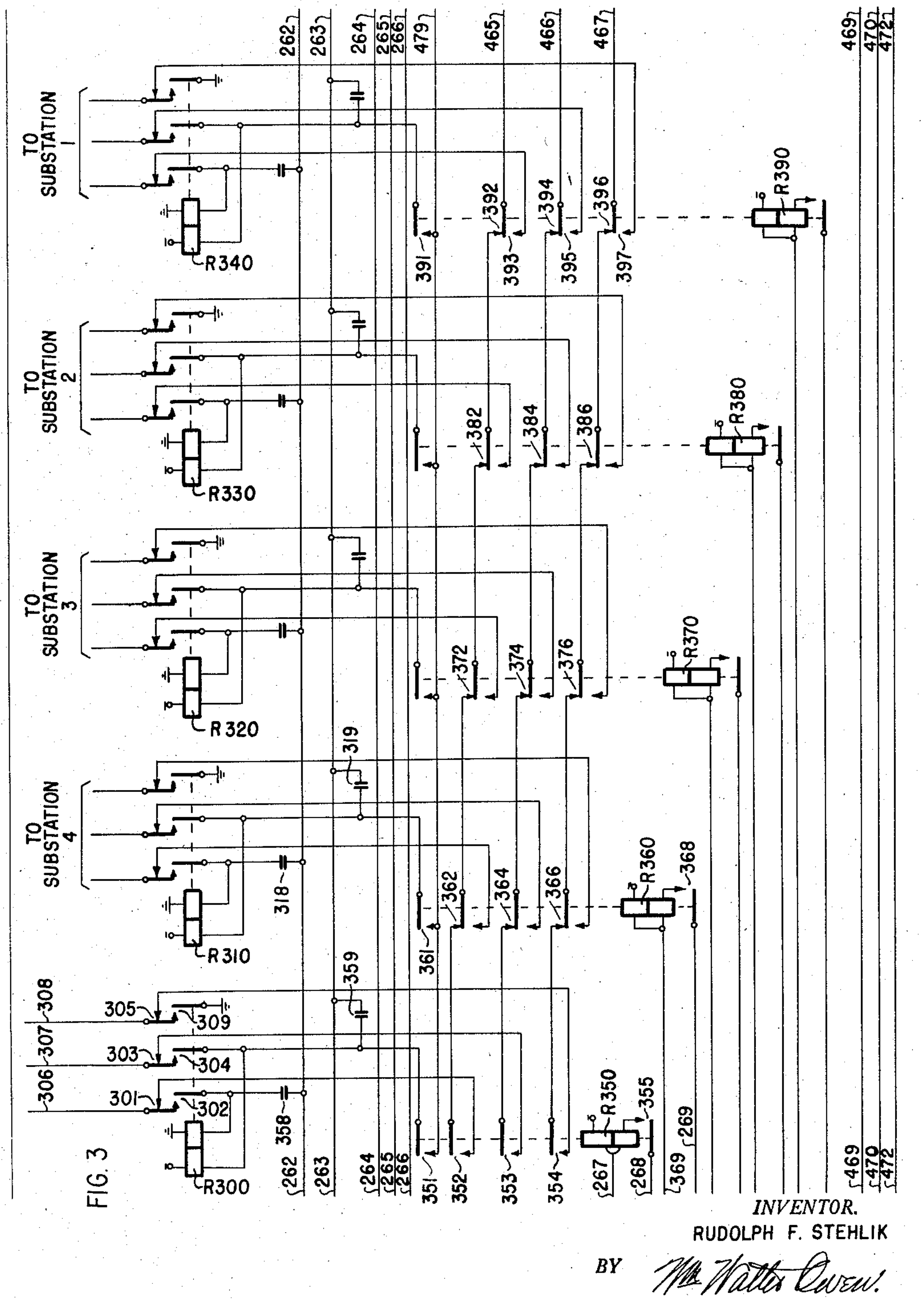
Figure 5:
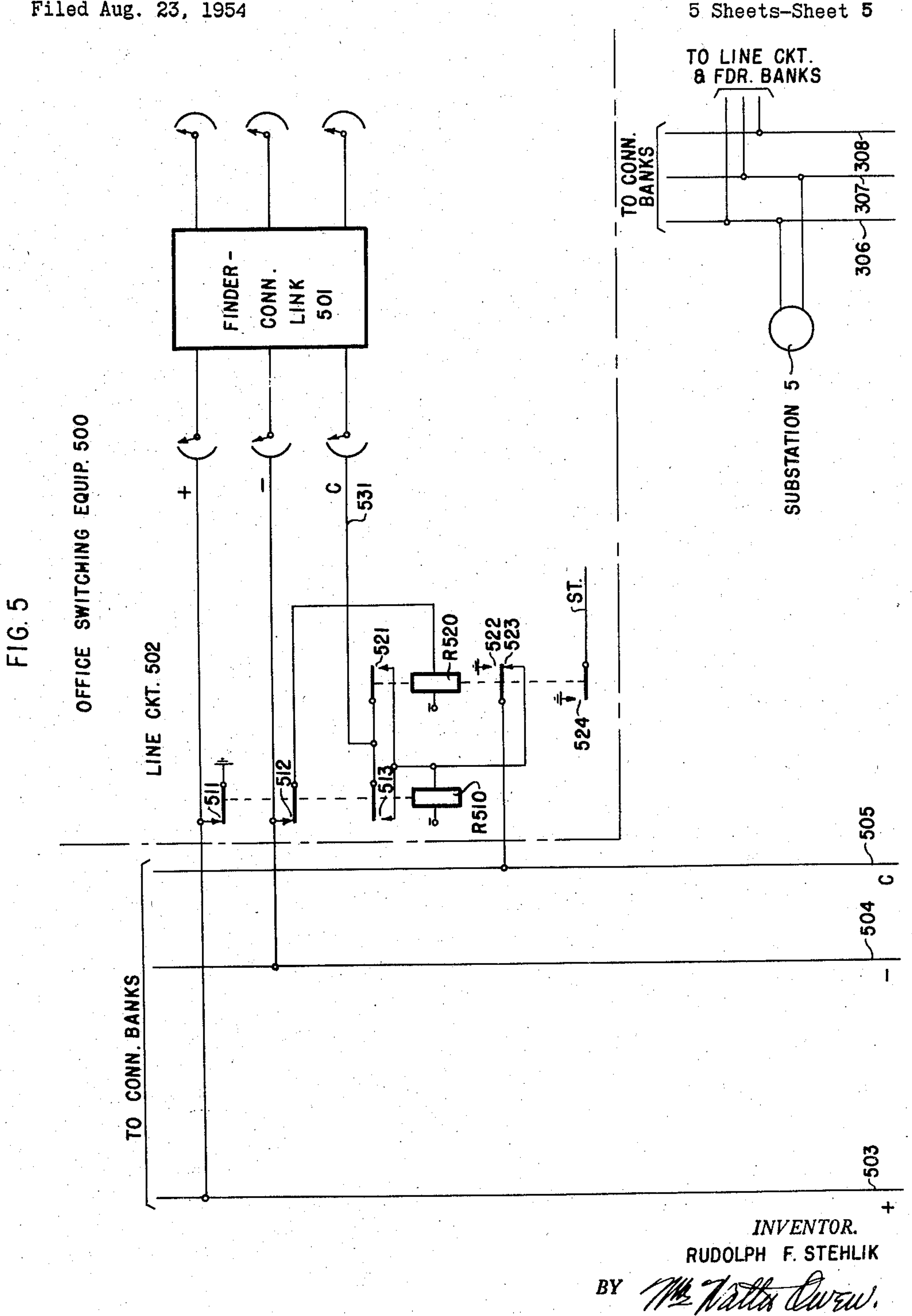

When the subscriber at the multiphone 200 desires to make a call by way of the office switching equipment 500, he will lift his receiver to close the hookswitch contacts 283 and 284. He will then momentarily depress a non-locking key to momentarily close contacts 281. Ground potential will be extended over contacts 281 to the connect relay R220 to operate said relay. At contacts 223 and 227, relay R220 will extend connections to line circuit 502 (Fig. 5), said connections extending from ground over contacts 511 (Fig. 5), conductor 503, contacts 223 (Fig. 2), 225, 211 and 227, through the winding of relay R230, conductor 504, contacts 512 (Fig. 5) through the winding of line relay R520 to battery. Relays R230 and R520 will operate in series over said circuit.

At contacts 231, R230 will complete an obvious locking circuit for the connect relay R220. At contacts 521, relay R520 will mark the bank contacts of the finder switches in the common switching equipment 500; at contacts 522, R520 will mark the connector banks and further will extend ground over conductor 505, contacts 229 (Fig. 2), the winding of hold relay R210 to battery to operate said relay; and at contacts 524, R520 will initiate the operation of equipment well known in the art for causing an idle finder to search for line circuit 502.

Figures 1, 6:
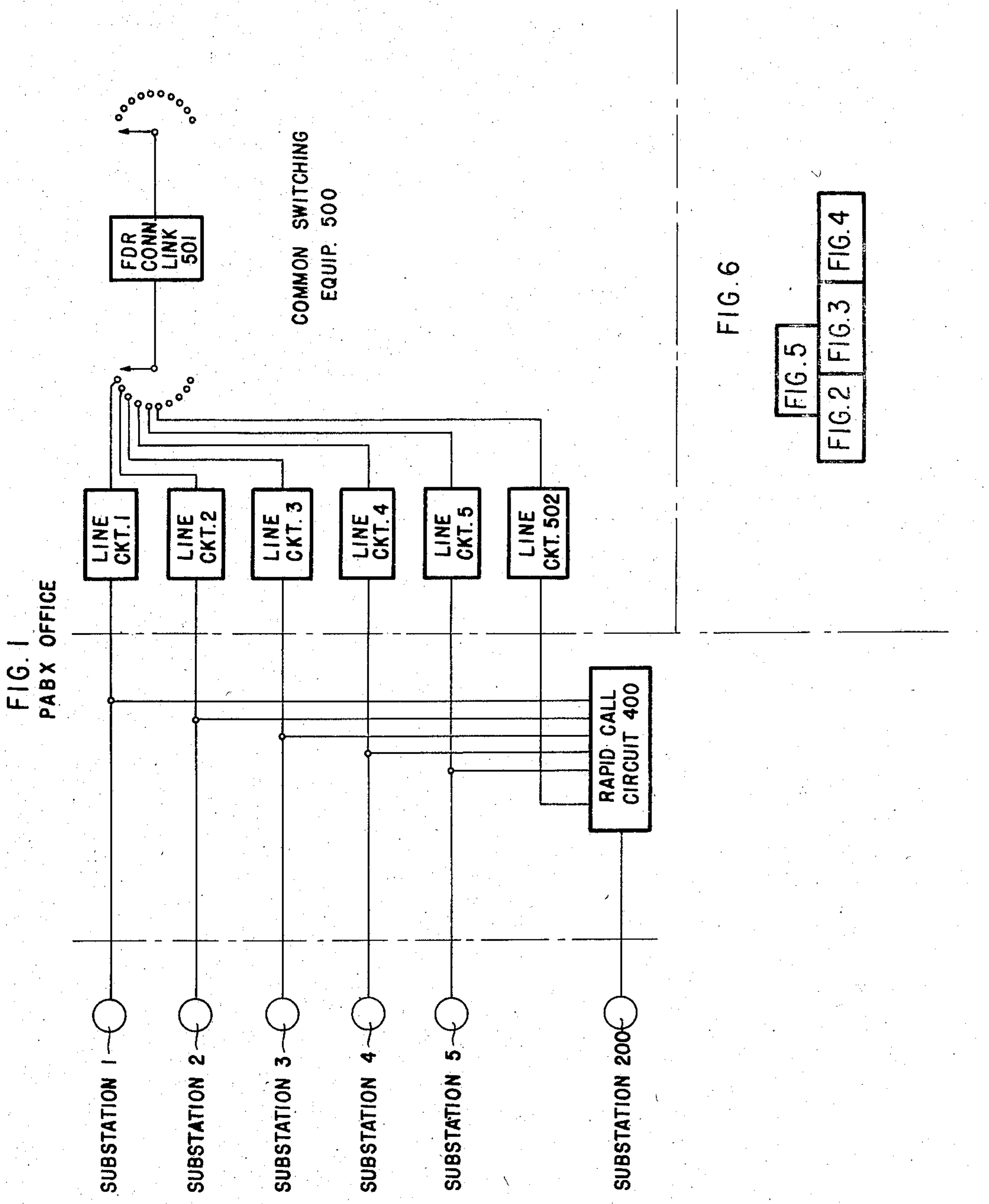

At contacts 218, R210 will complete an alternate circuit for locking the connect relay R220; at contacts 213 completes the loop circuit from substation 200 to its line circuit 502 and short circuits relay R230 to restore it. That part of the loop circuit shown in Fig. 1 extends from conductor 503, over contacts 223, contacts 290, transmitter 291, coil 293, hookswitch contacts 284, contacts 227 and 213 to conductor 504. At contacts 216, R210 completes an obvious circuit for maintaining itself operated over conductor 505.

When a finder connector link, such as link 501 (Fig. 5), finds and seizes line circuit 502, the cut-off relay R510 will be operated by ground potential extended from the link over conductor 531 and contacts 521 in the manner well known in the art. At contacts 511 and 512, relay R510 will restore the line relay R520; at contacts 513, R510 completes the circuit for maintaining itself operated. When R520 restores, said ground potential on conductor 531 will be extended over contacts 513 and 523 and conductor 505 to mark the line busy in the connector banks and to maintain the hold relay R210 operated. The multiphone subscriber will then dial the directory number of the desired line to extend connections thereto in a manner well known in the art.

In case that special features are incorporated in the private automatic branch exchange to which the multiphone 200 is connected, such as means for transferring incoming calls as shown in the United States Patent No. 2,501,546, issued to R. F. Stehlik on March 21, 1950, or means whereby multiphone 200 may be directly connected to a trunk extending to a community exchange as shown in the United States Patent No. 2,105,001, issued to Walter Michaelis on January 11, 1938, a switching key is provided which, when depressed, causes contacts 282 to extend direct ground to conductor 504 for the purpose of causing switching operations in a manner similar to that shown and described in said cited patents.

When another subscriber calls idle multiphone 200 by way of the switching equipment 500, the line circuit 502 will be seized over a connector in a finder-connector link, such as link 501, in a manner well known in the art, ground potential being extended over a private bank contact of said connector, conductor 505, contacts 523, through the winding of the cut-off relay R510 to battery to operate said relay, which relay will open, at contacts 511 and 512, the previously described circuit for line relay R520 and will mark the line circuit busy in the finder banks by extending ground potential over contacts 513 and conductor 531. Also, in a manner well known in the art, ringing current will be extended from the connector over a circuit including conductor 503, contacts 224 and 214, the ringer 237, capacitor 236, contacts 212 and conductor 504 to ring the multiphone 200. The subscriber at the multiphone 200 will lift the handset and depress a key to close contacts 281 to operate relay 220 as described above; and, since ground potential is encountered on conductor 505, relay R210 is immediately operated to complete the connections as described above.

*A rapid call from multiphone 200 to substation 5*

The subscriber at the multiphone 200 will lift his handset to operate the hookswitch contacts 283 and 284. Then he will depress a key to momentarily operate contacts 285 to complete a circuit for operating relays R240 and R350 in series, said circuit extending from ground through the winding of R240, contacts 283 and 285, conductor 267, through the upper winding of R350 to battery. At contacts 241, R240 will operate relay R440 and disconnect relay R270 over a circuit extending from ground over contacts 241, conductor 265 through the winding of R440 to battery and over contacts 441 and conductor 266 through the winding of R270 to battery. When R440 operates it opens contacts 441 to restore R270. During the momentary operation of R270, contacts 271 are closed to complete an obvious circuit for operating the hold relay R250 over its upper and middle windings. Relay R260 is a differentially wound relay and will not operate. At contacts 251 and 252, R250 completes a circuit for locking itself operated, said circuit extending from ground through the upper winding of R250 and the upper winding of R260 over contacts 251, 222 and 290, through the transmitter 291 and the coil 293, contacts 284, 226 and 252 and through the lower winding of R260 and the middle winding of R250 to battery; at contacts 253, R250 completes a circuit for holding the connect relay R350 operated, said circuit extending from ground over contacts 253 and 272, conductor 268, contacts 355 through the windings of R350 to battery.

When R440 operated, as described above, it also closed contacts 442 to complete a circuit for testing for the busy condition of the direct line extending to substation 5, said test circuit extending from battery through the winding of test relay R430, contacts 442, conductor 467, contacts 396, 386, 376, 366, 354 and 305 and conductor 308, which conductor is connected to the private conductor of the line circuit individual to substation 5.

If said substation 5 is busy, ground potential will be on said private conductor and will operate relay R430. R430 will close contacts 431 to start the ringing machine; at contacts 436, will prepare a circuit for locking itself operated; and, at contacts 438, will extend busy tone from the busy tone lead 468 over contacts 427, strap 481, contacts 438, conductor 469 through the lower winding of R250 to ground. By means of transformer action in relay R250 said busy signal will be extended over the above mentioned holding circuit for R250 to the receiver 292 in a manner well known in the art.

However, if substation 5 is idle, negative battery potential will be on conductor 308 and test relay R430 will not operate. When the subscriber releases the key to open contacts 285 relay R240 will restore to restore relay R440. At contacts 443 a circuit is completed for testing for the idle condition of substation 5, said circuit extending from ground over contacts 256, conductor 470, the upper winding of test relay R410, contacts 437, and 443, conductor 467, contacts 396, 386, 376, 366, 354 and 305 to battery on conductor 308. Test relay R410 will operate over this circuit; at contacts 411 will start the ringing machine; at contacts 414, R410 extends ground over its operating circuit to conductor 308 to mark substation 5 busy in the connector banks; at contacts 415, R410 completes a circuit for maintaining itself operated, said circuit extending from battery over the lower winding of R410, contacts 415 and 444, conductor 472 to ground on contacts 257; at contacts 412 and 413, will complete a circuit for ringing substation 5, said circuit extending from ground, over contacts 422 and 412, conductor 465, contacts 392, 382, 372, 362, 352 and 301, conductor 306 through the ringer of substation 5, conductor 307, contacts 303, 353, 364, 374, 384 and 394, conductor 466, contacts 413 and 424, through the upper winding of the ring cut-off relay R420 and over conductor 471 to the ringing generator (not shown).

When the subscriber removes the receiver, the ring cut-off relay R420 will be operated in a manner well known in the art over said ringing circuit.

At contacts 423 and 425, R420 removes a ringing current from the called line and extends said called line to the multiphone 200, said connections extending from contacts 423 over conductor 262, capacitors 294 and 295, contacts 251, 222, capacitor 298, transmitter 291, coil 293, switchhook contacts 284, contacts 226 and 252, capacitors 296 and 297, conductor 263 and contacts 425; and, at contacts 426, completes a circuit for maintaining itself operated, said circuit extending from battery through the lower winding of R420, contacts 426 and 444, conductor 472 to ground on contacts 257. Talking battery is supplied to substation 5 over the windings of relay R450, contacts 432 and 434, 423 and 425, and thence to substation 5 over a circuit described above.

Connections are now completed whereby the subscribers at substations 100 and 5 may converse with each other.

When the subscriber at substation 100 finishes said conversation, he may call one of the other substations to which he has access over direct lines by merely depressing the key corresponding to the desired substation. The operations will be substantially as described above with respect to the call to substation 5; except that, when the disconnect relay R270 is momentarily operated it will open contacts 272 to restore relay R350 which relay had been operated to connect substation 5 to the control circuits of substation 100. Also, when relay R440 operates, it opens contacts 444 to restore relays R410 and R420.

*Conference calls*

Assume that the multiphone subscriber desires to establish a conference call including substations 5, 4 and 3. He may call any of said substations first, for example substation 5, in the manner previously described.

When the subscriber at substation 5 answers, relays R250, R350, R410 and R420 will be in their operated positions, as previously described. The multiphone subscriber will then momentarily depress a non-locking key to close contacts 282 to extend ground potential over contacts 282, 284, 226 and 252, through the lower winding of the differential relay R260 and the middle winding of R250 to battery. No current will flow through the upper winding of R260 since it is short circuited; and R260 will operate momentarily.

At contacts 261, R260 completes a circuit for operating the conference hold relay R300, said circuit extending from ground over contacts 261, conductor 264, contacts 421, conductor 479, contacts 351, through the left winding of R300 to battery. R300 closes contacts 302, 304 and 309 to supply talking battery to substation 5, to mark substation 5 busy in the connector banks, and to connect substation 5 to the conference conductors 262 and 263 by way of capacitors 358 and 359. It will be noted that substation 5 will be released from the conference only if its handset is replaced on the cradle to open the line and restore R300.

With substation 5 connected into the conference circuit, the multiphone subscriber will depress a key to close contacts 286 momentarily. Relays R240 and R360 will operate over a circuit extending from ground, through the winding of R240, contacts 283 and 286, conductor 369 and the upper winding of R360 to battery. Relays R440 and R270 will be operated as previously described, the former relay restoring R410 and R420 at contacts 444, and relay R270 restoring R350 at contacts 272. Assuming that substation 4 is idle, R410 will reoperate to ring substation 4 after R440 restores. When the call is answered, R420 will reoperate; contacts 282 will be closed by the operation of their non-locking key to operate R260, R260 operating relay R310 over a circuit extending from ground over contacts 261, conductor 264, contacts 421, conductor 479, contacts 361, through the left winding of R310 to battery. R310 locks over the loop of substation 4 and connects said substation to the conference conductors 262 and 263 by way of the capacitors 318 and 319.

In a similar manner, substation 3 and/or substations 1 and 2 may be connected to the conference circuit. If one of the substations is wanted in conference only temporarily, it will be called last and its corresponding hold relay will not be operated. Then, by depressing the key of another substation in conference, the former substation will be released in a manner previously described.

*Initiating calls to and answering calls from the P.A.B.X exchange during local and conference calls*

First it will be noted that by using the strap 239, the multiphone may be marked busy in the finder and connector banks of the P.A.B.X when a rapid call or a conference is established from the multiphone, the ground potential marking extending from contacts 254 of the hold relay, over strap 239, contacts 217, conductor 505, contacts 523 and through the winding of the cut-off relay R510 to battery and from conductor 505 to the connector banks. R510 operates and extends ground to the finder banks by way of contacts 513 and conductor 531 to mark the line circuit 502 busy.

Whether or not said strap is used as described above, the multiphone subscriber may, during a conference, make a call by way of the office switching equipment 500 by merely depressing the key for closing contacts 281. If the strap is not used, relays R220, R230 and R520 will operate as previously described, then relays R210 and R510 will operate and R230 restores. Then the multiphone subscriber will dial the directory number of the desired subscriber. Meanwhile R220 when operated will have opened contacts 222 and 226 to restore the hold relay R250 followed by the restoration of any operated connect relay, such as R350, and the restoration of relays R410 and R420.

If the strap 239 is used, R250 also restores R510 to permit the operation of R520 and R230 as described above.

At contacts 221, R220 short circuits the conference conversation circuit preventing conversation between those substations called into the conference. Those conference hold relays R300, R310, R320, R330 and/or R340, which are operated, will hold their respective substations in conference.

If the multiphone subscriber desires to hold the P.A.B.X call and resume the conference, he will merely depress the key corresponding to any one of the substations in the conference, for example the key which closes contacts 285. As described previously relays R240 and R350 will operate, followed by the operation of relays R440 and R270, the latter restoring, then the operation of R250 and the restoration of R240 and R440. It will be noted that relays R410, R420 and R430 cannot operate because relay R300 is in its operated position maintaining contacts 301, 303 and 305 open. When relay R250 operates, it opens contacts 255 to restore the P.A.B.X connect relay R220; however, the hold relay R210 maintains the P.A.B.X connections over a loop circuit including conductor 503, contacts 224 and 215, the resistance element 238, contacts 228 and 213 and conductor 504. When R220 restores, it again completes the locking circuit for R250, over which circuit the substation 200 is again connected to the conference circuit. R220 also opens contacts 223 and 227 so that the subscriber on the P.A.B.X connection cannot listen in on the conference.

If the multiphone subscriber had desired to terminate the P.A.B.X call and to resume the conference, he would have opened the switchhook contacts 283 and 284 by momentarily replacing the handset on the cradle to disconnect the multiphone 200 from the switching equipment 500 in a manner well known in the art; then he would depress the key to close contacts 285 to reconnect himself to the conference circuit in the manner described above.

Assume that the multiphone subscriber has established a rapid call to substation 5, relays R250, R350, R410 and R420 being operated, and that he now wishes to make a P.A.B.X call.

If he wishes to hold the rapid call, he will depress the key to close contacts 282 to operate the differential relay R260 to operate the hold relay R300 in the manner previously described to hold substation 5. Then he will operate contacts 281, to connect substation 200 to the switching equipment 500 in the manner described above to make the P.A.B.X call.

However, if he wishes to terminate the rapid call when making the P.A.B.X call, he merely depresses the key to close contacts 281; the connections to switching equipment 500 will be completed as described above; and, since hold relay R300 is not operated, the rapid call connections will be restored to normal in the manner described above.

Assume that strap 239 is not used and that, during a conference or rapid call, the substation 200 is called by way of switching equipment 500 in the manner described previously. In the manner described above with respect to initiating P.A.B.X calls during a conference or rapid call, the subscriber will perform the same key operations to answer the incoming call and to hold the conference call or to hold or terminate the rapid call.

*Special features*

Optional provision is made for warning a subscriber, engaged in a conversation over substation 1, 2, 3, 4 or 5, that the multiphone subscriber has made a rapid call to his busy substation.

Figure 4:
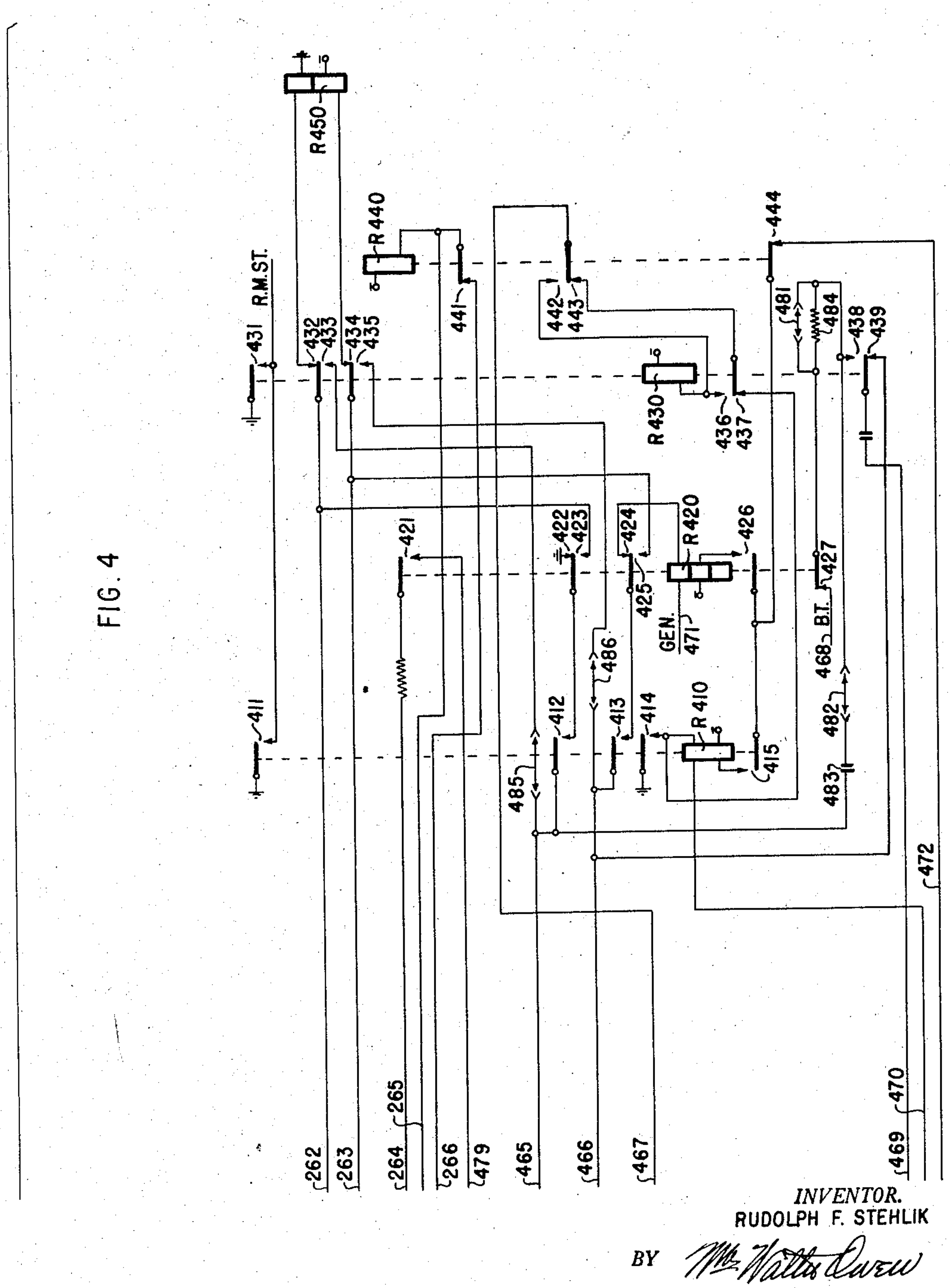

Assume that a rapid call has been made to the busy substation 5, relays R250, R350 and R430 being operated and busy tone being returned to the multiphone 200 as previously described. Assume now that the strap 482 is connected as shown in Fig. 4. Busy tone will also be extended from conductor 468, over contacts 427, straps 481 and 482, capacitor 483, conductor 465, contacts 392, 382, 372, 362, 352 and 301 to conductor 306 whence it will be extended to the conversation circuit to warn the subscriber on substation 5 that the multiphone subscriber has called. If the subscriber at substation 5 so desires, he may immediately hang up to terminate the conversation. His line will then be marked idle instead of busy; and, if the subscriber at the multiphone 200 has not hung up, the busy test relay R430 will restore (battery potential replacing ground potential when substation 5 is idle); then relay R410 will operate to ring substation 5, as previously described; and, when the subscriber at substation 5 answers, relay R420 will operate to complete the call as previously described. If the subscriber at the multiphone 200 has hung up, he will be called by the subscriber at substation 5 by way of the office switching equipment 500.

Optional provision is also made for giving the multiphone subscriber priority, whereby he will "bust into" the conversaiton when making a rapid call to a busy substation. Strap 482 is not connected; strap 481 is removed so that the intensity of the busy tone is reduced by the resistance element 484; and straps 485 and 486 are connected as shown in Fig. 4. When the multiphone subscriber initiates a rapid call to the busy substation 5, relays R240 and R350 will be operated, followed by the operations of R440 and R270, the operations of R250 and R430, then restoration of R270 and R440 all in the manner previously described. Busy tone of lower intensity is returned to substation 200 in the manner previously described. However, when R430 operates, it closes contacts 433 and 435 to connect the multiphone 200 to substation 5 by way of the previously described locking circuit for R250, capacitors 294, 295, 296 and 297, conductors 262 and 263, contacts 433 and 435, straps 485 and 486, conductors 465 and 466, contacts 392 and 394, 382 and 384, 372 and 374, 362 and 364, 352 and 353, and 301 and 303, and conductors 306 and 307 to substation 5. Busy tone is also extended over this circuit by meanas of transformer action in relay R250 (previously described). If the subscriber at the multiphone 200 desires to talk privately with the called subscriber, the latter will replace his handset in the cradle to abandon the existing call and again lift the handset. As previously described, R430 will restore followed by the operations of R410 and R420 which latter relays connect the multiphone 200 and substation 5 over circuits previously described.

While there has been described what is at present thought to be the preferred embodiment of the invention, various modifications may be made therein; and it is contemplated to cover in the appended claims all such modifications as fall within the true spirit and scope of the invention.

What is claimed is:

1. In a telephone system, a multiphone and a plurality of subsidiary substations, non-locking keys in the multiphone for each of said subsidiary substations, and relay means controlled by the momentary operation of each key for connecting the respective subsidiary substation to the multiphone and for disconnecting any other subsidiary substation connected thereto, an additional non-locking key in said multiphone common to all of said substations, and means controlled by the momentary operation of said additional key for locking any connected substations to said multiphone and thereby cause said connections to be maintained when another of said non-locking keys is operated.

2. In a telephone system, a multiphone and a plurality of subsidiary substations, non-locking keys in the multiphone for calling each of the subsidiary substations, a control circuit connected to the multiphone and having outgoing sets of conductors terminating in the subsidiary substations, relay means in said control circuit controlled by the momentary operation of each key for ringing the respective called subsidiary substation and for disconnecting any other subsidiary substation from the multiphone which may be connected thereto, and means in the control circuit operated when the call is answered for connecting said called substation to the multiphone over one set of said conductors.

3. The combination claimed in claim 2 wherein said relay means comprises a first group of relays individually associated with said keys and with said conductor sets, and individually operated responsive to operation of their respective keys to extend connections over their respective conductor sets to the corresponding subsidiary substations, a hold relay for providing battery feed to the multiphone and for holding said first group relays operated, a disconnect relay, means controlled by said keys for momentarily operating said disconnect relay to cause the disconnection of the multiphone from any subsidiary substation connected thereto other than the substation corresponding to the operated key and to operate said hold relay, and a test relay for completing a ringing circuit to the called substation if it is idle.

4. The combination claimed in claim 3 wherein said relay means also includes a test means for returning a signal to the multiphone if the called substation is busy.

5. The combination claimed in claim 4 together with means controlled by said test means for connecting said busy substation to the multiphone and for extending said signal to the busy substation and to the multiphone.

6. The combination claimed in claim 4 together with means for extending a signal to the busy substation warning the subscriber thereon that the multiphone user has called.

7. In a telephone system, in which any one of a plurality of substations may be connected to any other one of said substations by way of switching equipment common thereto and the lines and line equipment individual to each substation, a multiphone, a control circuit connected to said multiphone, the line equipment of a group of said substations connected to said control circuit, non-locking keys in the multiphone for each substation in said group, and relay means in the control circuit controlled by the momentary operation of each key for connecting the respective substation in said group to the multiphone and for disconnecting any other substation in the group connected to the multiphone by way of the control circuit, whereby rapid calls to substations in said group may be made from the multiphone without the use of said switching equipment and without hanging up if another substation in the group is connected thereto.

8. In a telephone system having a plurality of substations any two of which may be connected to each other by way of switching equipment common to all of said substations and by way of the lines and line equipment individual to each substation, a control circuit connected to one of said substations in one manner and to the line equipment of a group of said substations in another manner, non-locking keys in said one substation for each substation in said group that are manually operated to initiate calls to said substations in said group, relays in the control circuit, each operated by a respective one of said keys for preparing connections to its respective substation in said group, another relay for providing battery feed to said one substation and for holding said connect relays operated, a disconnect relay, means controlled by each of said keys for momentarily operating said disconnect relay to restore any operated connect relay other than the one corresponding to the operated key and to operate said hold relay, means in the control circuit automatically controlled for testing for the idle or busy condition of the called substation in said group, for ringing the called substation if it is idle and for returning a signal to the privileged substation if the called substation is busy, and means in the control circuit operated upon the call being answered for connecting the called substation to said one substation.

9. The combination claimed in claim 8 together with means controlled by said test means for connecting said one substation to a busy substation in said group and for extending a signal to said busy substation.

10. The combination claimed in claim 8 together with means in the control circuit for extending a signal to a busy substation in said group to warn the subscriber thereon that the privileged substation has called.

11. The combination claimed in claim 8 together with means also controlled by the momentary operation of one of said non-locking keys for marking the privileged substation busy in the common switching equipment.

12. In a telephone system, a multiphone and a plurality of subsidiary substations, non-locking keys in the multiphone for calling each of the subsidiary substations, a control circuit connected to the multiphone and having outgoing sets of conductors terminating in the subsidiary substations, relay means in said control circuit controlled by the momentary operation of each key for ringing the respective called subsidiary substation and for disconnecting any other subsidiary substation from the multiphone, and means in the control circuit operated when the call is answered for connecting said called substation to the multiphone, conference conductors in said control circuit, an additional non-locking key in the multiphone, and means controlled by the operation of said additional key when a substation in said group is connected to the multiphone for connecting said substation to the conference conductors, whereby a conference may be held over the multiphone and any two or more of the subsidiary substations.

13. In a telephone system, a multiphone and a plurality of subsidiary substations, non-locking keys in the multiphone for calling each of the subsidiary substations, a control circuit connected to the multiphone and having outgoing sets of conductors terminating in the subsidiary substations, relay means in said control circuit controlled by the momentary operation of each key for ringing the respective called subsidiary substation and for disconnecting any other subsidiary substation from the multiphone, and means in the control circuit operated when the call is answered for connecting said called substation to the multiphone, a conference relay in the control circuit for each substation in the group, a conference circuit in the control circuit connectable to all of the substations, an additional non-locking key in the multiphone, a relay controlled by said additional key for operating each of said conference relays when its corresponding subsidiary substation is connected to the multiphone, and contacts on said conference relays for connecting their respective substations to the conference circuit.

14. In a telephone system having a plurality of substations and common switching equipment for interconnecting any two of said substations by way of lines and line equipment individual to each substation, one of said substations having a pair of manually-operated non-locking keys, means controlled by the momentary operation of one of said keys for connecting said one substation to the common switching equipment for initiating or answering a call, a direct line for interconnecting said one substation and a second one of said substations, and means controlled by the momentary operation of the other key when connections are completed between said one substation and a third one of said substations by way of the common switching equipment for holding said last-mentioned connections and for connecting said one substation to said second substation by way of said direct line.

15. The combination claimed in claim 14 together with a third non-locking key in said one substation, means controlled by a momentary operation of the third key for completing a hold circuit for said direct line independent of said one substation, and means controlled by the subsequent operation of said one key for disconnecting said one substation from the direct line and for connecting said one substation to the common switching equipment, said last-mentioned holding circuit holding said second substation by way of the direct line.

16. In a telephone system having a plurality of substations and common switching equipment for interconnecting any two of said substations by way of lines and line equipment individual to each substation, one of said substations having a plurality of manually operated nonlocking keys, means controlled by the momentary operation of one of said keys for connecting said one substation to the common switching equipment to initiate or answer calls, a plurality of direct lines for interconnectig said one substation and certain others of said substations, certain of said keys corresponding individually to said certain substations, conference conductors, means controlled by each of said certain keys for connecting said one substation to the respective certain substation and to the conference conductors, means controlled by the momentary operation of another one of said keys when a certain substation is so connected for transferring said certain substation and its direct line to the conference conductors and for completing for said certain substation a holding circuit independent of the privileged substation, whereby conference calls may be made between said one substation and any number of said certain substations, said first means also controlled by the momentary operation of said one key when a conference call has been set up, for transferring said one substation from the conference conductors to the common switching equipment, said certain substations being held over their holding circuits, a holding circuit for said common switching equipment, said second means also controlled by said certain keys when the privileged substation is connected to the common switching equipment for transferring it to the conference conductors and for rendering the holding circuit for said common switching equipment effective.

References Cited in the file of this patent

UNITED STATES PATENTS

| | | |
|---|---|---|
| 2,278,410 | Bascom et al. | Apr. 7, 1942 |
| 2,374,072 | Beaumont | Apr. 17, 1945 |
| 2,377,562 | Lomax | June 5, 1945 |
| 2,385,515 | Herrick | Sept. 25, 1945 |
| 2,534,850 | Bowne | Dec. 19, 1950 |
| 2,549,719 | Stehlik | Apr. 17, 1951 |
| 2,561,946 | Pedatella | July 24, 1951 |
| 2,700,070 | Vincent | Jan. 18, 1955 |